(12) United States Patent
Drinkwater et al.

(10) Patent No.: US 6,369,919 B1
(45) Date of Patent: Apr. 9, 2002

(54) HOLOGRAPHIC SECURITY DEVICE

(75) Inventors: Kenneth John Drinkwater; Brian William Holmes, both of Surrey (GB)

(73) Assignee: De La Rue International Limited, Hampshire (GB)

(*) Notice: Subject to any disclaimer, the term of this patent is extended or adjusted under 35 U.S.C. 154(b) by 0 days.

(21) Appl. No.: 09/673,916

(22) PCT Filed: May 12, 1999

(86) PCT No.: PCT/GB99/01498

§ 371 Date: Nov. 14, 2000

§ 102(e) Date: Nov. 14, 2000

(87) PCT Pub. No.: WO99/59036

PCT Pub. Date: Nov. 18, 1999

(30) Foreign Application Priority Data

May 14, 1998 (GB) .............................................. 9810399

(51) Int. Cl.⁷ .......................... G03H 1/20; G03H 1/30; B42D 15/10; G06K 9/00
(52) U.S. Cl. ................ 359/2; 359/25; 359/31; 283/86; 283/901
(58) Field of Search .................. 359/1, 2, 22–25, 359/31, 35, 30, 32, 33; 283/86, 901, 902

(56) References Cited

U.S. PATENT DOCUMENTS

| | | | |
|---|---|---|---|
| 3,547,511 A | * 12/1970 | King | 359/25 |
| 3,556,628 A | * 1/1971 | Burckhardt | 359/24 |
| 3,560,070 A | * 2/1971 | Pennington et al. | 359/24 |
| 4,244,633 A | * 1/1981 | Kellie | 359/25 |
| 5,912,767 A | * 6/1999 | Lee | 359/567 |

FOREIGN PATENT DOCUMENTS

| | | |
|---|---|---|
| EP | 0-604-943-3 | 7/1994 |
| WO | WO-92-04692 | 3/1992 |
| WO | WO-93-18419 | 9/1993 |
| WO | WO-95-04948 | 2/1995 |

* cited by examiner

*Primary Examiner*—Jon Henry
(74) *Attorney, Agent, or Firm*—Oliff & Berridge, PLC

(57) ABSTRACT

A holographic security device comprising first and second holographic generating structures (2,3) recorded in respective sets of substantially non-overlapping regions of a record medium is disclosed. The regions of one set are interleaved with regions of the other set, whereby both interleaved line structures are substantially non-visible to the unaided eye, whereby the holographic security device generates two or more holographic images (A,B) viewed from separate viewing directions around the device and normally seen by tilting the device. Each particular holographic image in a viewing direction is generated in whole or part by the holographic structure associated with one set of interleaved lines.

20 Claims, 6 Drawing Sheets

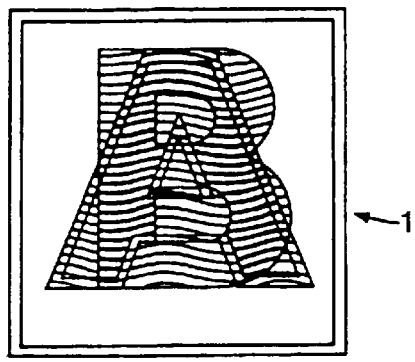
Fig. 1B
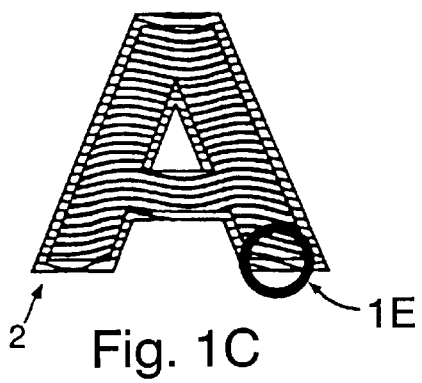
Fig. 1A
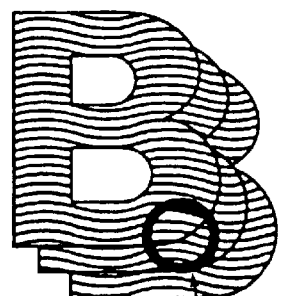
Fig. 1C
Fig. 1D
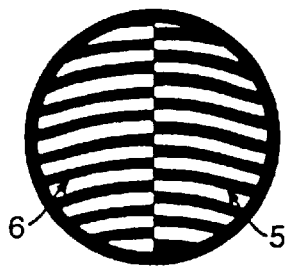
Fig. 1F
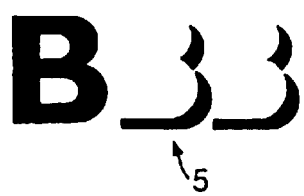
Fig. 1H
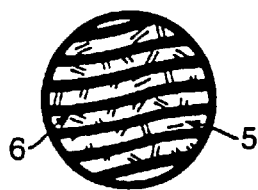
Fig. 1G
Fig. 1E

HOLOGRAPHIC SECURITY DEVICE

Security documents such as bank notes now frequently carry optically variable devices (OVDs) such as diffraction grating or holographic optical microstructures as a security feature against copy and counterfeit. This has been motivated by the progress in the fields of computer based desktop publishing and scanning which renders conventional security print technologies such as intaglio and offset printing increasingly accessible to counterfeit. A particularly good way to strengthen security documents against counterfeit is to combine security print with optically variable diffractive devices whose structures are non-copiable by scanners and which can exhibit optically variable effects such as colour changes by diffraction, apparent runs and movement effects and distinct switches between images. A particularly advantageous effect is where the OVD produces a distinct clear switch between two or more overlapping images providing a clear effect that cannot be simulated by print.

Several such classes of diffractive based security devices exist. Two common types, both based on arrays of surface diffraction gratings, are the "Exelgram" developed by CSIRO (Commonwealth Scientific and Industrial Research Organisation), Australia and the Kinegram, developed by Landis and Gyr, Switzerland. These are described in WO-A-93/18419, WO-A-95/04948 and WO-A-95/02200 for the Exelgram and U.S. Pat. No. 4761253 and EP-A-0105099 for the Kinegram. Both of these techniques use directly written localised surface diffraction gratings, written in the case of the Exelgram by an electron beam direct write process and in the case of a kinegram by the recombining step and repeat process outlined in U.S. Pat. No. 4761253.

Both of these techniques enable one precise diffraction grating to be written into a particular area. In the case of WO-A-95/02200, a device is disclosed displaying two angularly separated but overlapping diffracted images made from two completely overlapping diffraction grating areas while WO-A-95/04948 details a diffraction grating device made from a series of tracks of diffraction grating structures that exhibits a clearly switching image where the separate images can occupy overlapping areas. Both of these devices have been used for applications on security documents such as bank notes. Another type of device that can exhibit optical switching effects is a holographic structure manufactured using older holographic techniques. A typical example of such a device used as a security device on a bank note is the multiply redundant hologram described in EP-A-0558574 where to maintain holographic efficiency the hologram uses spatially separated switching image.

Now for application on a security document such as a bank note, the microscopically rough surface of the paper can have a severely detrimental effect on a diffractive image given that it is typically applied as a thin layer of embossed lacquer applied using the known print process of hot stamping. This is because the roughness of the surface and paper fibre intrusion severely disrupts the integrity of the thin layer of lacquer carrying the diffractive structure, thereby severely degrading its optical efficiency. It is therefore very important that the optical efficiency of the diffractive structure is maximised which has tended to result in the use of diffractive devices, such as the Exelgram, where there is a device to achieve an optically variable effect defined by a switch between two or more overlapping images. This is because the controlled "direct write" style origination technique of an Exelgram or Kinegram allow close control of the areas of diffraction grating allowing switching overlapping images to be created from two sets of interwoven tracks (WO 95/04948) so that each microscopic area of the device only consists of one diffraction grating which, when blocked onto the rough surface of a paper document, maintains its diffraction efficiency reasonably well as it is possible to maximise the single grating modulation whereas a switching device made up of overlapping diffraction grating areas would have a lower overall diffraction efficiency due to the complicated nature of the overlapping microstructures.

In accordance with one aspect of the present invention, a holographic security device comprises first and second holographic image generating structures based on originations prepared using an H1/H2 process, the structures being recorded in respective sets of substantially non-overlapping regions of a record medium, the regions of one set being interleaved with regions of the other set, whereby both interleaved structures are substantially non-visible to the unaided eye, whereby the holographic security device generates two or more holographic images viewed from separate viewing directions around the device and normally seen by tilting the device, and whereby each particular holographic image in a viewing direction is generated in whole or part by the holographic image generating structure associated with one set of interleaved lines.

By holographic structures this description means structures that generate graphical images by the mechanism of diffraction of light where the original pattern has been generated by a holographic process of optical interference, whereby within the manufacturing stage of this origination process at least one component of the image may contain a rainbow hologram and where optionally at least one holographic intermediate hologram or H1 is used which enables at least one component of the resulting image optionally to contain true holographic depth effects if desired (as associated with 2D/3D or 2D rainbow holograms as known in the art). This description also applies to surface 2D structures generated by the above holographic process but constrained to lie substantially on the image plane of the final device and with the preferred option of being constrained in the range of spatial frequencies contained therein (i.e. viewing angle of replay). This forms in the limiting case of extreme constraint a holographic structure substantially similar in visual performance to a pure diffraction grating structure but subtlely distinct in that on a microscopic level the microstructure will have been formed by a holographic projection process and may contain evidence of recorded laser generated speckle pattern structures.

This development relates to the method of enhancing the visibility and efficiency of a security hologram particularly for application to paper security documents such as bank notes where paper roughness and intrusion from paper fibres severely degrades the efficiency of a conventional hologram. This development also allows the creation of an optical microstructure which upon illumination generates two or more overlapping images which can be observed by eye from at least two separate viewing directions around the device. Although this is possible using conventional holographic techniques by recording overlapping holographic images with the optical microstructure pertaining to each image simply superposed in the area of overlap, the resulting composite microstructure will always replay each component of the image with a reduced efficiency or brightness compared to a single diffractive structure. In fact, the presence of overlapping diffractive microstructures always results in a structure with a reduced optical diffraction efficiency compared to a single diffractive structure due to the presence of overlapping microstructure and always tends to witness the presence of the second "ghost" image in the overlap area due to medium saturation and a reduction in optical efficiency. This is due to the presence in the overlapping areas of two very different holographic structures with different orientations to the carrier grating frequencies. This limits the overall optical efficiency and observed brightness of the holographic image, which is particularly disadvantageous in bank note holograms where there is a severe reduction in perceived brightness after application of the hot stamping foil to the bank note. For this reason, this type of hologram is rarely used on a bank note application and instead a diffraction grating based image would often be preferred due to the retention of a greater diffraction efficiency after application.

This aspect of the invention thus allows the creation of a holographic security device (as opposed to a diffraction grating based image) with two or more very clear and bright graphical overlapping holographic images located in the same area of the device but visible at different orientations, which importantly retains a high diffraction efficiency when applied as a hot stamping foil on a bank note despite the disruption to the microstructure caused by the paper roughness and fibre intrusion. This enables the efficiency and apparent brightness of each of the observed overlapping images to be comparable to that of a single holographic image device. The images also appear "solid" to the eye.

This is achieved by ensuring that each small area of the device only contains the holographic microstructure pertaining to one graphical image enabling a much greater microstructure holographic grating modulation to be achieved without visibly degrading the second graphical image by the appearance of a "ghost image" of the first graphic which would otherwise appear due to medium saturation in areas of superposed microstructures. Importantly this allows the master holographic embossing shims and holographic hot stamping foil to be over modulated to compensate for structure relaxation and degradation due to paper roughness on application, so that the final optical microstructure on the paper is at peak diffraction efficiency.

Preferably, this is achieved by subdividing the two or more graphical images into an interlocking grid of fine lines, whose structure could be regular but is preferably more complex and at a scale size of 25–100 $\mu$m (although larger line widths are possible for larger graphic images although at 250$\mu$ the line widths are becoming straightforwardly discernible to the unaided eye). The use of the very fine line widths of size 25–50$\mu$ or 25–75$\mu$ ensures that the line patterns within the images are non discernible to the unaided eye (the limiting resolution of the eye is around 20$\mu$, for a high contrast image, typically reduced by a factor of 3 or 4 for a lower contrast pattern to c. 80–100$\mu$). Another useful aspect of this invention is that because each image is truly a projected holographic image containing a recorded in random speckle pattern, the apparent contrast of the fine line structure is significantly reduced by the superposition with it of a granular speckle pattern within each diffracted image, providing a significant contrast resolution in the fine line patterns and so very effectively hiding the line patterns from view by reducing the unaided eyes limiting resolution.

Any point on the image surface contains microstructure pertaining to only one graphic image, this microstructure being a holographic diffractive microstructure, being created by the interference of a diffused wave front that recreates the graphic image and a second coherent beam. A very important property of this structure is that this area is truly a holographic structure containing a range, albeit small, of spatial frequencies of microstructure and also containing a recorded speckle pattern characteristic of a holographic microstructure and also where each small area of the device replays a controlled predetermined solid core of ray angles, albeit of limited viewing angle, as opposed to a pure diffraction grating where each point of the image would replay a pure point replay. A particularly important aspect of this invention is that each graphic or component of a graphic therefore can replay a predetermined and controlled cone of rays allowing importantly the close control of view angle and parallax and angle of view.

A particularly important aspect of this invention over other multiple graphical replay purely diffraction grating techniques such as the CSIRO and Landis & Gyr work is that this interleaving technique enables a purely holographic image to replay two or more overlapping switching graphic images with comparable efficiency to conventional pure diffraction grating devices. These conventional devices generally require an extremely cumbersome and complicated direct write approach to the formation of the master diffraction grating structure to ensure that the master structure contains only a single pure diffraction grating in any one area. The new technique enables a comparable optical brightness, efficiency and switching appearance to be obtained from a pure hologram and holographic technique with an equivalent brightness when applied onto the rough paper surface of a bank note or similar security document.

This non-overlap of images can be obtained by splitting the image field into a set of interlocking fine line apertures—with each interleaved line aperture defining one direction component of the diffractive/holographic patterns to ensure that each small area of the device only contains one dominant diffraction grating carrier frequency to ensure a high diffraction efficiency is obtained for the image after blocking onto rough paper. A single dominant diffraction grating in each area will be less effected by degradation due to fringe competition and will also have a wide latitude on exposure/development and embossing replication enabling the structure to be over modulated in groove depth on the master shim and on the embossed foil to compensate for relaxation and degradation due to surface roughness. As a result, each separately viewed holographic image appears substantially independent of any degradation or cross talk or medium saturation effects from the other image(s). Another important aspect is that the fine line apertures are typically of a line width size below the resolution limit of the normal eye and so are essentially invisible to an observer.

A preferred embodiment of this device is where the holographic structure is formed as a surface relief for manufacture by embossing and casting processes and for application to documents of value as surface relief structures. This could be, for example, in the form of a label or applied as a hot stamping foil or potentially directly embossed into a layer on the surface of a document where this technique will provide a major improvement in performance for such devices when they are being created holographically. However, other forms of holographic recording known in the art, such as reflection holograms, could also be used.

In a typical device the interleaved fine line structures are of a size below the normal size resolution of the unaided human eye. Also in a typical device the interleaved graphical image components are localised on the surface plane of the hologram as surface relief 2D rainbow holograms.

A typical security hologram such as a typical 2D/3D hologram as known in the art (e.g. G. Saxby, Practical Holography, Publisher Prentice Hall) can be created from several holographic components—these various components will consist of different graphical subdivisions recorded normally with different spatial frequencies and possibly orientations of the rainbow hologram carrier frequency gratings to provide for example different viewing directions and/or different relative colours by dispersion. This is a common technique for embossed holograms of 2D/3D images, where to produce relative holographic colour effects a piece of artwork would be split into separate graphical areas each recorded in a different rainbow hologram carrier grating spatial frequency to provide different areas of different replay angles and dispersions, using the different dispersions to provide relative colour effects, and each separate artwork subdivision recorded with a different carrier grating spatial frequency and/or different direction can be described as a "holographic component" of any particular holographic image, with the sum of the replays of these holographic components making up the whole holographic image observed.

In some embodiments of the device at least one interleaved holographic image component may contain true holographic depth. In some embodiments of the device at least one interleaved holograhic image component may contain a 3D effect from a model. In some embodiments of the device both interleaved holographic image components can be used to exhibit true holographic depth effects or in some embodiments of the device both interleaved holographic image components may contain true 3D holographic images and 3D effects from models.

A useful aspect of this development is the potential to alter the line widths ascribed to each diffractive channel to achieve the required relative brightness between views whilst retaining the ability to fully saturate both gratings to achieve optimum efficiency and groove depth, in contrast to a normal hologram where it would not be possible to saturate fully both gratings due to medium saturation ("burn out") and the use of the relative brightness to achieve the desired brightness balance between viewing channels. This approach enables a two channel hologram to be over-modulated in terms of grating groove depth thus enabling a banknote two or more channel hologram to obtain the same degree of grating over-modulation as can be produced by a purely direct written diffraction grating device. So this technique provides a method of producing the whole final diffractive structure simultaneously using holographic transfer techniques using separated holograms recorded in non-overlapping areas by using a very fine line grid pattern well below eye resolution. This is in contrast to the other "direct write techniques" which often can only write a single grating structure in one area or obtain spurious gratings at the overlap of tracks (e.g. CSIRO electron beam techniques) and therefore need to leave gaps, these holographic structures are deliberately butted together and can slightly overlap as the degradation in a hologram structure on overlap is much less than for 2 overlapping directly written diffraction gratings as in the overlap areas there is a lower diffraction efficiency due to the angle change between the two tracks which generate noise gratings. This enables there to be a small overlap between the interleaved line structures to enable most efficient use of the recording medium.

At a microscope level ($\times 50$), these structures according to the invention contain a characteristic random speckle pattern. The only way to create this type of image would be by highly sophisticated holographic projection techniques involving close control of replay forms, Bragg and holographic parameters far in excess of that normally available from a standard holographic laboratory. These devices would therefore on microscopic level, by the speckle structure, be obviously different from a diffraction grating device, whereby under a microscope the size being replayed would contain a characteristic granular pattern. Another advantage of using a holographic technique and recording a granular speckle pattern in the image is that this granular pattern is a major factor in reducing the visibility of the interleaved line grid structure which can be made completely invisible to the naked and modestly aided ($\times 10$) eye.

There are other useful aspects to this development when applied to 3D holographic images made from either true 3D models or planes of flat art (2D/3D techniques) and also to techniques such as holographic stereograms in which the increase in the diffraction efficiency (brightness) and signal to noise ratios (clarity) using these techniques could be advantageous.

Considering the case of normal rainbow holograms with depth, normally in a holography image made of two or more viewing channels each consisting of an overlapping 3D model designed to provide a switching effect, areas of overlap between the models exhibit significant noise and medium saturation. These overlapping areas and medium saturation both limit the overall brightness obtainable. So a particularly advantageous technique would be to record the two or more 3D models using a conventional H1 technique (see, for example, G Saxby, "Practical Holography", publisher Prentice Hall) but recorded through interleaving fine line masks. On projection of each H1 to record the final hologram (either done sequentially or in parallel) the fine line masks would be focused onto the image plane of the final H2 hologram thus ensuring that the diffractive optical microstructures corresponding to the hologram of each 3D model were localised in different areas of the medium so reducing image cross talk and mutual degradation due to medium saturation. An important aspect of this is that each 3D hologram would replay its image in a particular localised direction to provide an optical switching effect between two overlapping images and that the fine interlocking line masks used would contain line widths beneath the normal resolution of the human eye which would therefore not be visible to a normal observer (requiring separation of masks of roughly the sizes of line widths outlined above).

An alternative way to achieve this result would be to record the relevant H1's for each 3D model without any fine line mask at the H1 recording stage but to introduce the fine line masks at the H2 transfer stage. This is a fairly common masking technique similar to that used in certain 2D/3D techniques. However, these previous masking techniques generated a surface rainbow hologram by using some form of true or lenticular diffuser to generate the rainbow slit and a mask on the photoresist H2 being located to define the recorded graphical patterns. The technique proposed here is different in that a true H1 of a 3D model (or similar) is used to project an image onto the H2 region forming a real image near the plane of the photoresist (or other surface relief recording material) being used to record the H2. The fine line aperture mask corresponding to one recording would then be placed in front of the H2 recording material, in close proximity to it. The function of the aperture mask is to spatially localise the recording into particular areas of the H2 material so localising into one set of fine line areas of the optical microstructure corresponding to one channel of the switching image design. Another, or subsequent aperture mask, interlocking with the first, would then be used similarly to isolate the H2 recordings of subsequent projected H1's corresponding to differing viewing channels in different spatially distinct areas of the recording material. The function of this would be to isolate the optical microstructure corresponding to the 3D image in the second and subsequent viewing channels into spatially separate regions of the final material using an aperture mask of line widths non resolvable to the unaided eye. One particular advantage of the projection technique linked into an aperture masking technique near the H2 plane is that this would allow the 3D image to straddle the plane of the H2 and to contain portions both in front of and behind the surface plane of the final H2. It should be appreciated from the above description that this is a particularly useful technique to ensure a high fidelity reproduction of two or more channel holograms of 3D models made up of planes of flat art (2D/3D techniques), or of final image holograms containing combinations of true 3D images and diffractive structures made from flat art graphics, or even for example non-holographically produced structures made using direct write type techniques—(e.g. recombination or electron beam, two typical trade name commercial techniques would be the Kinegram and the Exelgram) and that this would provide an effective way to produce a new class of diffractive security device containing two or more overlapping diffractive images—one of a true holographic 3D image from a model or combinations of flat artwork and the other a non holographically produced surface relief diffractive device.

This leads to a second aspect of the present invention in which a security device is provided comprising a holographic image generating structure based on an origination prepared using an H1/H2 process, and a diffraction grating structure recorded in respective sets of substantially non-overlapping regions of a record medium, the regions of one set being interleaved with regions of the other set, whereby both interleaved line structures are substantially non-visible to the unaided eye, whereby the holographic security device generates a holographic image and a diffractive effect viewed from separate viewing directions around the device and normally seen by tilting the device, and whereby each particular image or effect in a viewing direction is generated in whole or part by the structure associated with one set of interleaved lines.

A further usage of this technique would be in the creation of holographic stereograms—a common technique used to create apparent three dimensional hologram from many (c.20–200) views of a subject (e.g. see "Practical Holography", by G Saxby). In a conventional holographic stereogram, many different views (20–200) of a subject are recorded together to provide a composite 3D view of a real subject. However, this technique normally results in severe medium saturate and burn out being visible due to the many different overlapping images. One useful application of the masking technique would be to split one viewing channel into several separate mask apertures (say 3 or 4) to reduce the range of spatial frequencies in any particular area of the device to increase brightness. Thus, for example, one area of the device would only contain the left views of the subject over a certain angle, say 10 or 20 views, all of which would have similar carrier grating spacings and orientations so reducing medium saturation ("burn out") and so increasing brightness. So this technique could be applied to holographic stereograms to reduce the number of overlapping images on each area of the medium and so increase image brightness—again the key being to use masks and curvilinear line patterns beneath the normal resolution of the human eye.

The invention thus provides a method of enhancing the brilliance and clarity of multi channel holographic images and particularly for reducing the effects of surface roughness by producing via holographic means two or more high clarity overlapping switching holographic images containing 3D modules or 2D/3D holographic images or 2D graphics located in the same area of the device being visible at different orientations by splitting the image field into a number of discrete interlocking areas using maperture line masks each of a size below the resolution of the normal eye to allow recording of ideally only one or a limited number of diffraction grating spatial frequencies to maximise the efficiency and apparent brightness of each of the observed images and to avoid "ghost" affects of one image upon another normally seen in multi channel images.

An additional advantage of the interleaved hologram structure is to provide an enhancement in replay efficiency and hence brightness of the image over and above that which would be possible from a purely sinusoidal diffraction grating structure. The interleaved approach enables the microstructure applicable to each channel of an overlapping multi-channel image to be stored in a substantially independent spatial area of substrate. This reduces fringe competition in these areas as stated above thus producing substantially higher efficiency optical components for the image. However, this also enables non-sinusoidal grating structures to be recorded in these areas. (i.e. structures which have substantially different diffraction efficiencies between the +1 and −1 diffracted orders, in contrast to sinusoidal grating structures which have an equal efficiency between diffracted orders). A particular type of useful structure is one where the desired diffractive order is enhanced over the undesired order thus producing an enhancement in optical brightness of the observed image. Such a structure is typically known as a "blazed" diffractive order—this is known in the field of the production of pure diffraction gratings for spectroscopy (e.g. M. Hutley, "Diffraction Gratings", Academic Press 1982) but not in image holographic structures replaying graphical images, particularly where the holographic image switches between two overlapping graphics, images where normally such enhanced efficiency structures cannot be accessed due to the nature of the image holographic processes and fringe competition. In one typical geometry a blazed image holographic structure is recorded for a preferential efficiency enhancement by recording an interference pattern between a reference beam, and an object beam with both beams impinging on the recording material from the same side of the geometric normal. Note that the interleaved process combined with the H1-H2 preferred origination process enables each component of an interleaved hologram to be recorded with an individually different blaze angle to preferentially enhance the diffraction efficiency in the desired viewing order for this component. This is a substantive improvement over the two previous known systems designed by Landis and Gyr and CSIRO mentioned above. The Landis and Gyr system by stamping down small areas of linear grating at different angles can only use substantially the same sinusoidal structure for any particular spatial frequency—the CSIRO system cannot produce a profiled blazed grating structure and so cannot enhance the desired orders—the advantage of the interleaved structure combined with an H1-H2 or masking production process is that each individual element of the interleaved hologram is automatically blazed in the correct orientations in the recording geometry.

Thus, one or both structures may comprise blazed holographic structures so as to enhance the diffraction efficiency of the or each structure.

Holographic security devices according to the invention can be used for a wide variety of purposes to add security to documents and articles. As already mentioned, they are particularly suited for use with documents or articles having relatively rough surfaces being made of paper and the like but can also be used with other materials such as plastics. Examples of articles which can be secured using such devices are passports, passbooks, tickets, permits, licences, financial transaction cards including cheque guarantee cards, charge cards, credit cards, cash withdrawal cards, electronic funds transfer cards, service entitlement cards, personal or article identification cards, prepayment cards, telephone cards, variable e.g. decrementing value cards, bonds, fiscal documents, bank notes, cheques including travellers cheques, vouchers, brand identification labels, tamper resisting or indicating labels.

The device is conveniently constructed in the form of a transfer assembly such as a hot stamping foil enabling it to be transferred onto a document or article to be secured. In that situation, typically the device carries a heat sensitive adhesive (or pressure sensitive adhesive) on its exposed surface.

Further security of an article, such as a document of value, to which the device can be applied, is achieved by including the device in a generic pattern with a multiplicity of the devices.

Some examples of holographic security devices according to the invention together with methods for their manufacture will now be described with reference to the accompanying, schematic drawings, in which:

FIG. 1A illustrates a first example of a device according to the invention;

FIG. 1B illustrates the appearance of the device from two different viewing angles;

FIGS. 1C and 1D illustrate the two holographic generating structures in more detail;

FIG. 1E illustrates the line patterns used by the two holographic structures in enlarged form;

FIGS. 1F and 1G illustrate the different colour separations used to create the structure shown in FIGS. 1C and 1D respectively;

FIG. 1H illustrates the offset between the line patterns in more detail;

Figure 2A:
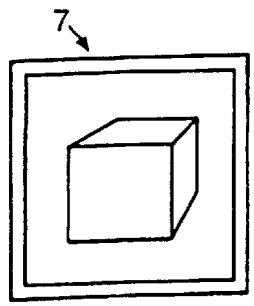
FIGS. 2A and 2B illustrate holograms generated by two holographic generating structures of the second example.
Figure 2B:
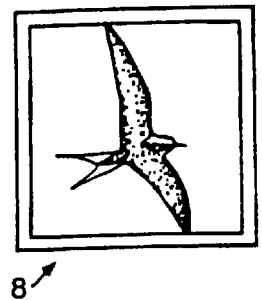
Figure 2C:
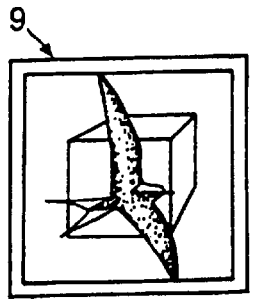
FIG. 2C illustrates the second example of the device.

FIG. 1 shows a two channel holographic device 1 with two image channels showing overlapping switching graphics holograms A and B (FIG. 1A), each channel being recorded as a set of very fine lines 2, 3 (shown illustratively in FIGS. 1C and 1D as these line structures would normally be beneath the normal visual resolution and thus normally not visible) so that each area of the image only contains one diffractive structure with, for example, the images switching on left to right tilting (FIG. 1B). An enlargement of these non-overlapping image channels is shown in FIG. 1E showing the same area of the two channels of images A & B magnified to a scale where one line corresponds typically to between 20 and 120 microns depending on the individual example, showing schematically how the two areas containing each image channel are interleaved, whilst FIG. 1H, again showing a greatly magnified view of each pattern, further illustrates two spatially separate areas butted together to show how the lines 6 of one structure are offset from the lines 5 of the other structure, so that the optical microstructures corresponding to individual diffractive elements occupy essentially independent areas and do not substantially overlap. FIGS. 1F and 1G illustrate the way in which the artwork for each channel can be further subdivided into different diffractive structures to provide different optical effects such as colour switches. It should also be appreciated that being a holographic image the graphics A and B need not necessarily be localised on the surface, but could have true depth, although the masking fine line patterns defining each separate diffractive area would certainly be localised on the surface.

FIG. 2 shows a similar two channel device 9 (FIG. 2C) but this time consisting of two 3D models 7, 8 (FIGS. 2A, 2B) where the holographic image switches between an image of a cube 7 and a bird 8 (for example) on left to right tilting. In this case, each image is that of a true 3D model recorded as a holographic generating structure into separate defined areas of a surface relief structure using fine interleaving line patterns as shown in the enlargements (shown illustratively in FIGS. 2D, 2E as these fine interlocking line structures would normally be beneath the usual visual resolution and therefore non-visible.). FIG. 2F shows a greatly magnified view of a small area of the pattern showing how, on a microscopic scale, the lines of each structure are relatively offset and substantially non-overlapping so that substantially only a single diffractive structure occupies any one small area of the device. This would be very advantageous in reducing medium saturation effects and cross talk so providing very high quality and high clarity switching images, with the linework patterns into which the two images are divided being chosen to be so fine as to be beneath the normal resolution of the human eye.

Figure 2D:
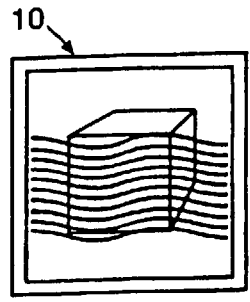
FIGS. 2D and 2E illustrate a line structure superimposed upon the two holographic structures respectively.
Figure 2E:
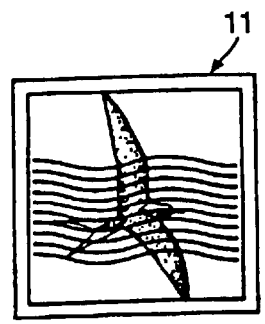
Figure 2F:
FIG. 2F illustrates the line structures in enlarged form.

It should be understood that the lines will not normally be visible to the naked eye so that the images will appear solid, with FIGS. 2D, 2E showing the lines illustratively only and FIG. 2F showing a microscopic scale enlargement.

Figure 3A:
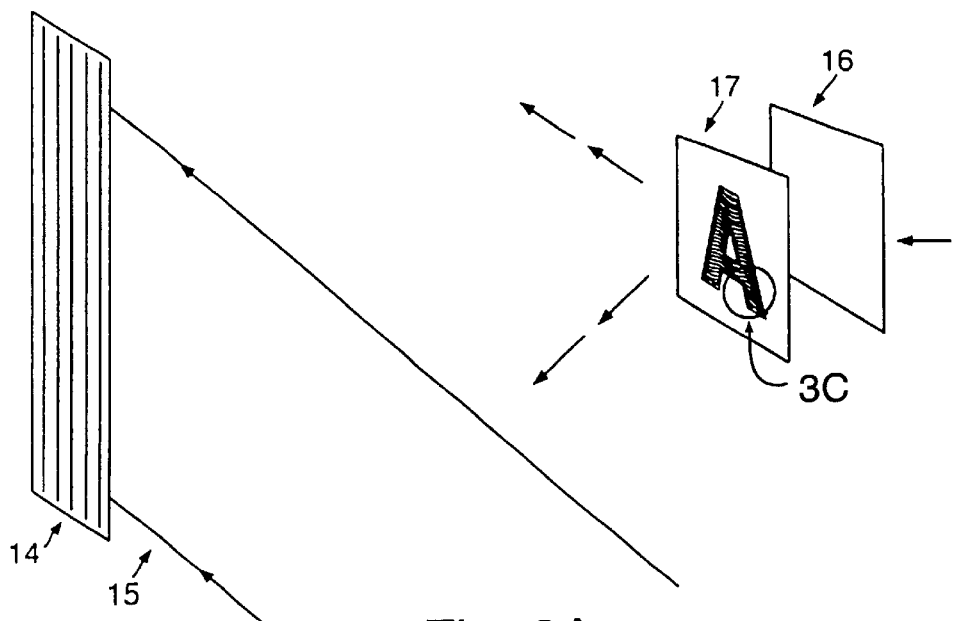
FIGS. 3A and 3B illustrate a first example of a method of constructing a holographic security device.
Figure 3B:
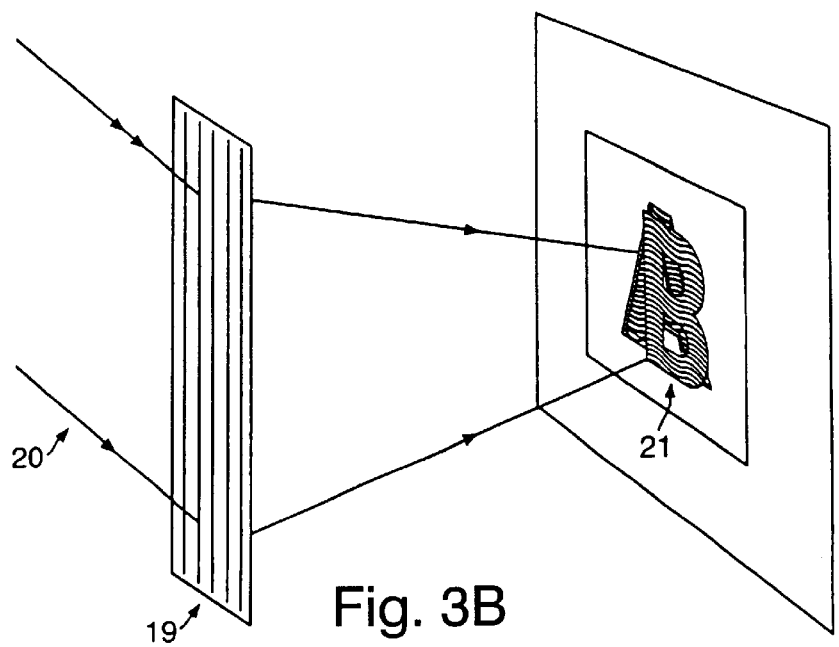
Figure 3C:
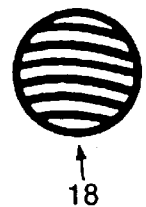
FIG. 3C show an enlarged view of lines also shown in FIG. 3A.
Figure 4A:
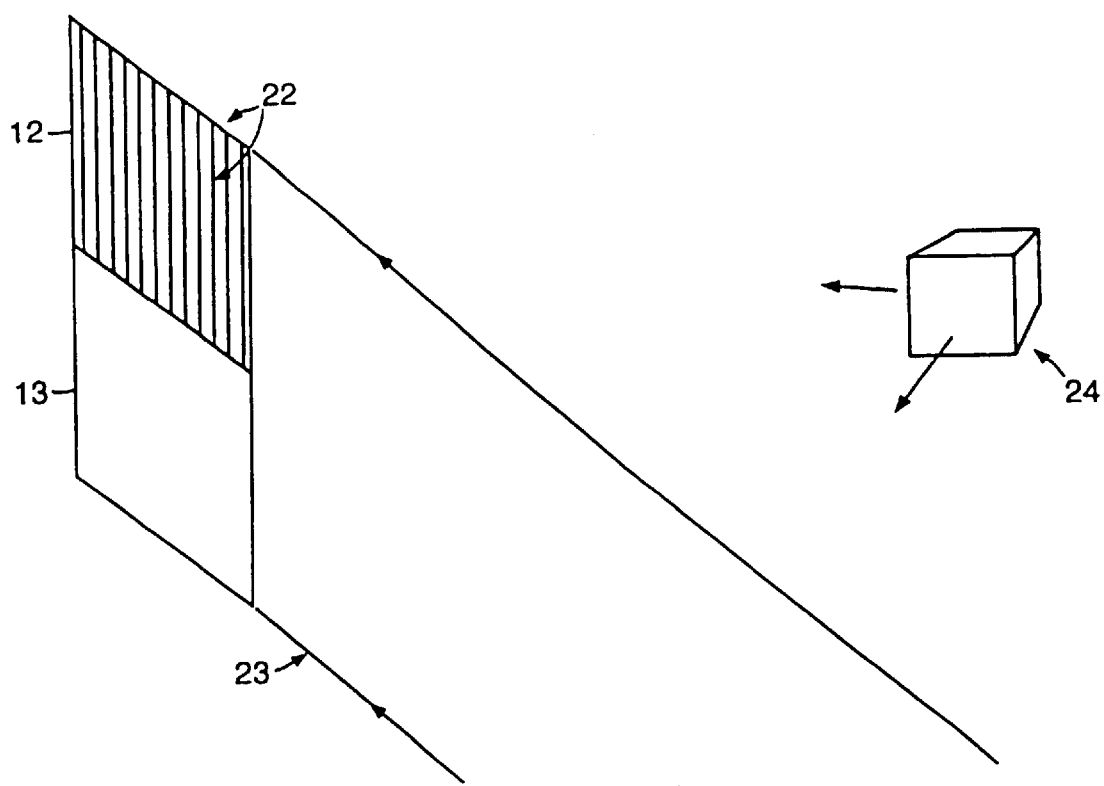
FIGS. 4A and 4B illustrate a first step in a second example of a method of manufacturing a security device.
Figure 4B:
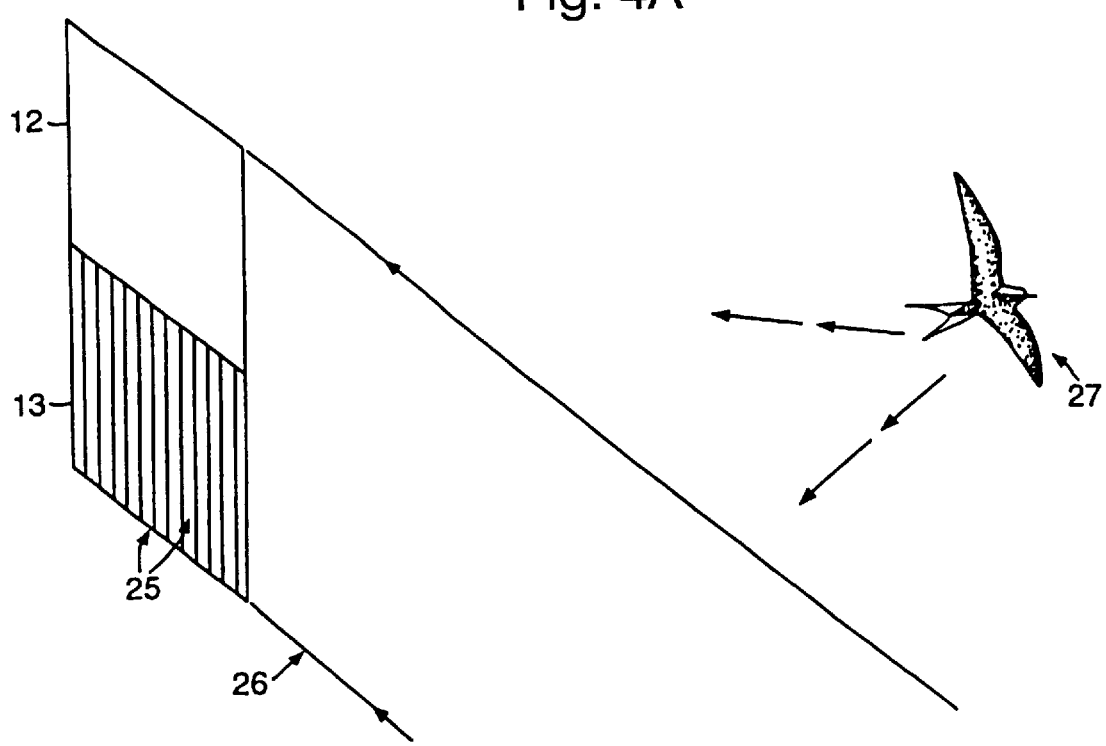
Figure 5A:
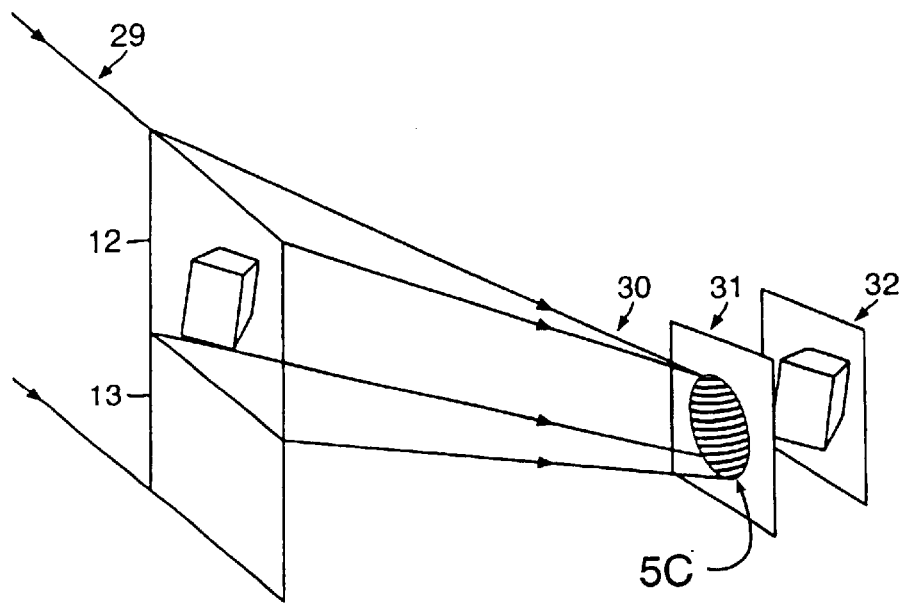
FIGS. 5A and 5B illustrate a second step in the process.
Figure 5B:
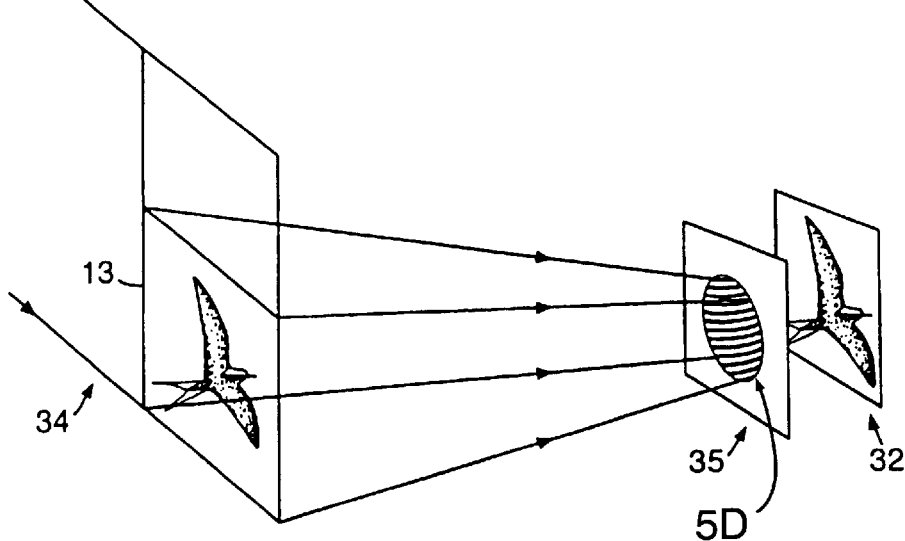
Figure 5C:
FIGS. 5C and 5D show masks used in the process of FIGS. 5A and 5B.
Figure 5D:
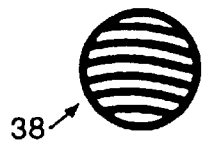

FIG. 3 shows a first method of producing a switching two or more channel image by using artwork masters consisting of fine line arrays. Initially, artwork 17 is prepared which from a distance has the appearance of a letter A but on close inspection is formed by a series of curvilinear lines 18. This artwork 17 is exposed through a diffuser 16 onto a recording medium 14 in conjunction a with a reference beam 15 to form a H1 exposure. A similar H1 is formed by exposing a second graphics image such as a B (not shown). The arrangement shown is for recording the first component image A. For image B a similar H1 is formed by a similar process exposing the graphical image artwork for image B. The processed H1 19 is then used with a conjugate reference beam 20 to project a real image of the complex multicolour 2D/3D hologram so as to record an H2 21 with a second reference beam being added (not shown) as well known in the art to form a substantially image plane transfer hologram or H2. The lines of the first image A are interleaved with the lines of the second image FIGS. 4 and 5 show an alternative manufacturing technique which can be applied using 3D models. In a first stage (FIG. 4), a H1 22 is formed by exposure to a 3D model 24 in conjunction with a reference beam 23 (FIG. 4A). This hologram is recorded in an upper section 12 of the H1, the lower section 13 being masked. The lower section 13 is then unmasked and the upper section 12 masked (FIG. 4B) and a second object 27 is recorded using a reference beam 26.

The upper section 12 of the processed H1 28 is then exposed to a conjugate reference beam 29 producing a projected image 30 which is formed on an image plane 31 containing a mask carrying many, spaced curvilinear lines shown in more detail at 37 placed in close proximity to a recording medium 32. Thus, the original object 24 is recorded holographically in a series of closely spaced lines 37 on the record medium 32. This produces a series of localised diffractive structures.

The lower section 13 of the H1 is then exposed using a conjugate reference beam 34, the resultant image being formed at an image plane 35 containing a second fine line mask shown in more detail at 38, the lines of the mask 38 being interleaved with the lines of the mask 37, the resultant image being recorded on the record medium 32. The masks 37, 38 constitute amplitude masks. The two images will be recorded so as to define left and right channels respectively while the lines of the masks 37, 38 will be beneath normal eye resolution and therefore not discernible to the normal viewer.

Figure 6A:
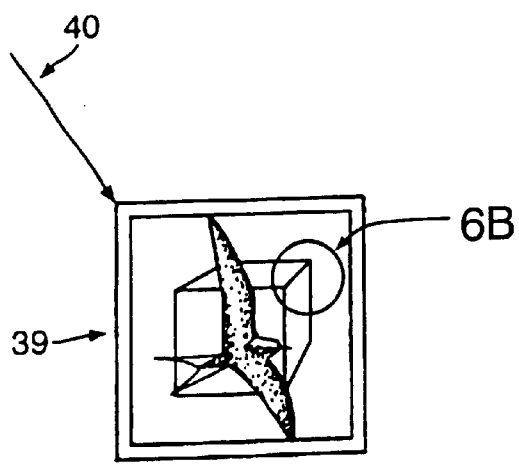
FIG. 6A illustrates the holographic device formed using the process shown in FIGS. 4 and 5.

FIG. 6A illustrates the finished device 39 under white light illumination 40. FIG. 6B illustrates an enlargement of a small area of the holographic structure formed from the model 24 and the fine line structure can be seen.

Figure 6C:
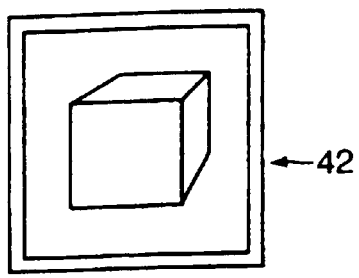
FIG. 6B illustrates a portion of the first holographic structure, in enlarged form; and, FIGS. 6C and 6D illustrate the appearance of the device at two different viewing angles.
Figure 6D:
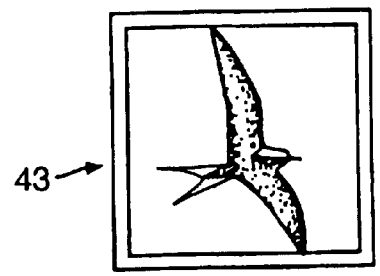
Figure 6B:
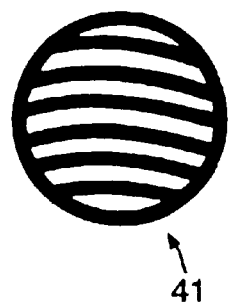

A left view of the device 39 is shown at 42 in FIG. 6C and a right view at 43 in FIG. 6D.

What is claimed is:

1. A holographic security debice comprising first and second holographic image generating microstructure, each structure having been originated by creating an intermediate first hologram from a respective object and a first reference beam, the two first intermediate holograms then having been illuminated with respective transfer beams which were the conjugates of the corresponding first reference beams to reconstruct their respective objects as holographic images which were then used to record the first and second holographic image generating structures on a common holographic recording medium through the process if optical interference with a second reference beam, wherein the microstructures are recorded in respective sets of substantially non-overlapping regions of the recording medium, the regions of one set being interleaved with regions of the other set, whereby the dimensions and pattern of the interleaving is substantially non-resolvable to the unaided eye, whereby the holographic security device generates two visually distinct holographic images viewed from separate viewing directions around the device and normally seen by tilting the device, and whereby each particular holographic image in viewing direction is generated structure associated with one or other set of interleaved region.

2. A device according to claim 1 wherein the regions are linear.

3. A device according to claim 2 wherein the linear regions are curvilinear.

4. A device according to claim 3 wherein the holographic image generating structures are formed as a surface relief.

5. A device according to claim 4 wherein the regions are linear and wherein each region has a width in the range 25–75 microns.

6. A device according to claim 1 wherein each holographic image generating structure generates only one holographic image.

7. A device according to claim 1 wherein the holographic images generated by the first and second holographic image generating structures are visible at different viewing angles.

8. A device according to claim 7 wherein the first and second holographic image generating structures generate holographic images defining different views of the same object.

9. A device according to claim 1 wherein at least one of the holographic image generating structures generates a holographic image made up of a number of graphical image components.

10. A device according to claim 9 wherein the graphical image components are localized on the surface plane of the device as surface relief 2D rainbow holograms.

11. A device according to claim 9 wherein at least one holographic image component contains true holographic depth.

12. A device according to claim 9 wherein at least one holographic image component contains a 3D effect from a model.

13. A device according to claim 1 wherein both holographic image generating structures generate holographic images exhibiting true holographic depth effects.

14. A device according to claim 1 wherein at least one of the holographic image generating structures is in the form of a blazed holographic image generating structure.

15. A transfer assembly comprising a carrier and a holographic security device detachably secured to the carrier, the holographic security device comprising first and second holographic image generating microstructures, each structure having been originated by creating an intermediate first hologram from a respective object and a first reference beam, the two first intermediate holograms then illuminated with respective transfer beams which were the conjugates of the corresponding first reference beams to reconstruct their respective objects as holographic images which were then used to record the first and second holographic image generating structures on a common holographic recording medium through the process of optical interference with a second reference beam, wherein the microstructures are recorded in respective sets of substantially non-overlapping regions of the recording medium, the regions of one set being interleaved with regions of the other set, whereby the dimensions and pattern of the interleaving is substantially non-resolvable to the unaided eye, whereby the holographic security device generates tow visually distinct holographic images viewed from separate viewing directions around the device and normally seen by tilting the device, and whereby each particular holographic image in a viewing direction is generated in whole or part by the holographic image generating structure associated with one or other set of interleaved regions.

16. An assembly according to claim 15 wherein the carrier can be detached from the holographic security device by application of heat.

17. A document or other article carrying a holographic security device comprising first and second holographic image generating microstructures, each structure having been originated by creating an intermediate first hologram from a respective object and a first reference beam, the two first intermediate holograms then having been illuminated with respective transfer beams which were the conjugates of the corresponding first reference beams to reconstruct their respective objects as holographic images which were then used to record the first and second holographic image generating structures on a common holographic recording medium through the process of optical interference with a second reference beam, wherein the microstructures are recorded in respective sets of substantially non-overlapping regions of the recording medium, the region of one set being interleaved with regions of the other set, whereby the dimensions and pattern of the interleaving is substantially non-resolvable to the unaided eye, whereby the holographic security device generates two visually distinct holographic images viewed from separate viewing directions around the device and normally seen by tilting the device, and whereby each particular holographic image in a viewing direction is generated in whole or part by the holographic image generating structure associated with one or other set of interleaved regions.

18. A method of manufacturing a transfer hologram, the method comprising creating a pair of intermediate first holograms from respective objects and first reference beams; illuminating the two first intermediate holograms with respective transfer beams which are the conjugates of the corresponding first reference beams to reconstruct their respective objects as holographic images; using the holographic images to record first and second holographic image generating microstructures on a common holographic recording medium through the process of optical interference with a second reference beam, wherein the microstructures are recorded in respective sets of substantially non-overlapping regions of the recording medium, the regions of one set being interleaved with regions of the other set, whereby the dimensions and pattern of the interleaving is substantially non-resolvable to the unaided eye, whereby the transfer hologram generates two visually distinct holographic images viewed from separate viewing directions around the hologram and normally seen by tilting the hologram, and whereby each particular holographic image in a viewing direction is generated in whole or part by the holographic image generating structure associated with one or other set of interleaved regions.

19. A method of manufacturing a holographic security device, the method comprising manufacturing a transfer hologram using a method according to claim 18, and using the transfer hologram to transfer the holographic image generating structures on to a further record medium.

20. A method according to claim 19 for manufacturing a holographic security device comprising first and second holographic image generating microstructures, each structure having been originated by creating an intermediate first hologram from a respective object and a first reference beam, the two first intermediate holograms then having illuminated with respective transfer beams which were the conjugates of the corresponding first reference beams to construct their respective objects as holographic images which were then used to record the first and second holographic image generating structures on a common holographic recording medium through the process of optical interference with a second reference beam, wherein the microstructures are recorded in respective sets of substantially non-overlapping regions of the recording medium, the regions of one set being interleaved with regions of the other set, whereby the dimensions and pattern of the interleaving is substantially non-resolvable to the unaided eye, whereby the holographic security device generates two visually distinct holographic images viewed from separate viewing directions around the device and normally seen by tilting the device, and whereby each particular holographic image in a viewing direction is generated in whole or part by the holographic image generating structure associated with one or other set of interleaved regions.

* * * * *